(12) United States Patent
Jia

(10) Patent No.: US 11,304,444 B2
(45) Date of Patent: Apr. 19, 2022

(54) MECHANICAL VAPORIZER

(71) Applicant: Shenzhen TopGreen Technology Co. Ltd., Guangdong (CN)

(72) Inventor: Guobin Jia, Guangdong (CN)

(73) Assignee: Shenzhen Topgreen Technology Co Ltd., Guangdong (CN)

( * ) Notice: Subject to any disclaimer, the term of this patent is extended or adjusted under 35 U.S.C. 154(b) by 428 days.

(21) Appl. No.: 16/552,182

(22) Filed: Aug. 27, 2019

(65) Prior Publication Data

US 2021/0059315 A1    Mar. 4, 2021

(51) Int. Cl.
     *A24F 1/28*      (2006.01)
     *G01K 5/48*      (2006.01)
     *A24F 42/20*     (2020.01)
     *A24F 42/60*     (2020.01)

(52) U.S. Cl.
     CPC .............. *A24F 1/28* (2013.01); *A24F 42/20* (2020.01); *A24F 42/60* (2020.01); *G01K 5/48* (2013.01)

(58) Field of Classification Search
None
See application file for complete search history.

(56) References Cited

U.S. PATENT DOCUMENTS 1,281,589 A * 10/1918 Kummeth ................. A24F 1/26
                                                           131/181
2017/0013877 A1* 1/2017 Breiwa, III ........... A61M 15/06

* cited by examiner

*Primary Examiner* — Michael J Felton
*Assistant Examiner* — Katherine A Will
(74) *Attorney, Agent, or Firm* — Jen-Feng Lee, Esq.

(57) ABSTRACT

Present invention teaches a mechanical vaporizer primarily consisting of a mouth piece, an outer tube, and inner tube wrapped by a spring. A heat sink provides the insolation between the outer tube and the heating chamber that contains a side window to show temperature by the length extension of a sensing coil and allows easy removal of used vaping material to be removed.

6 Claims, 4 Drawing Sheets

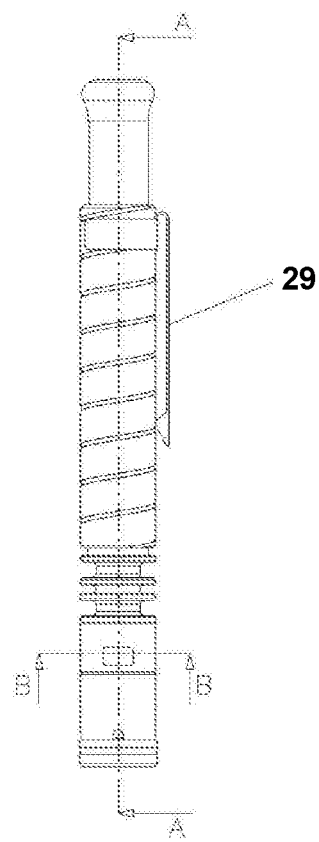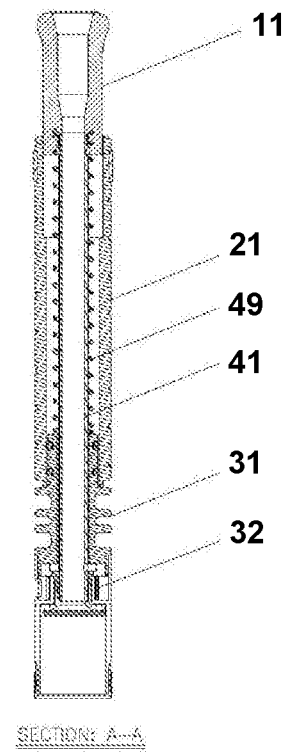
Fig. 3A    Fig. 3B
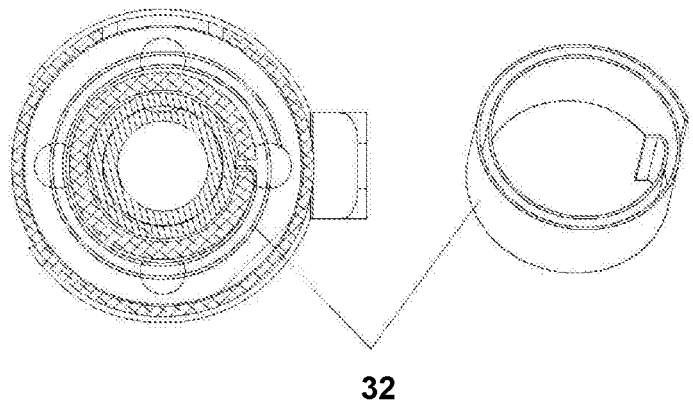
Fig. 4A    Fig. 4B

MECHANICAL VAPORIZER

FIELD AND BACKGROUND OF THE INVENTION

Present invention relates to personal vaporizers, which are handheld devices that vaporize certain medium such as a liquid solution, vaping tobacco or wax-like materials. The vapor is then inhaled by its user. A typical personal vaporizer has an atomizer having a heating element that selectively heats the medium in order to produce the vapor.

Some versions of vaporizers use electricity to heat the vaping medium.

Present invention disclosed a mechanical vaporizer primarily consisting of an outer tube, an inner tube, and a spring wrapped around said inner tube. A mouth piece is sized to slidably fit inside a top end of said outer tube.

A heat sink serves an insulation purpose and isolates the outer tube, which is the part held by human hands, from the high temperature generated by the heating chamber.

The vaporizer of present application does not use any battery or electricity, but relies on direct heating (slow burn) to create vapor. The mechanism allows easy removal of the vaping materials by opening the detachable bottom cap.

SUMMARY OF THE INVENTION

The mechanical vaporizer of present application primarily consists of an outer tube, an inner tube, and a spring that wrapped around said inner tube. A mouth piece is sized to slidably fit inside a top end of said outer tube.

The spring has a top end connected to the mouth piece and a bottom end touching an end disc, providing the resilient force when the mouth piece is pressed inward.

A heat sink is connected to said outer tube. The heat sink isolates the outer tube from the high temperature generated by the heating chamber.

A sensing coil is placed, and anchored inside the heating chamber. The coil is visible from the outside via a side window. It will extend its length when heated, causing said side window to show different portions of the coil at different temperatures. The sensing coil is further painted with different colors at different sections, so as to indicate different temperatures of the sensing coil when the vaping materials are heated up.

The vapor, produced from the materials heated inside the heating chamber, will travel up the air path inside the inner tube to the mouth piece when a user inhales.

DESCRIPTION OF THE DRAWINGS

The accompanying drawings, which are incorporated in and constitute a part of this specification, illustrate and exemplify the preferred embodiments of the invention. Together with the description, serve to explain the principles of the invention.

A brief description of the drawings is as follows:

FIG. 3A is a side assembled view of the vaporizer.

FIG. 3B is a side assembled view of the vaporizer, with internal parts shown.

FIG. 4A is a cutout vertical profile view of the heating chamber.

FIG. 4B shows the sensing coil.

DETAILED DESCRIPTION OF THE PREFERRED EMBODIMENT

The mechanical vaporizer of present application primarily consists of an outer tube 21 that contains an inner tube 41 with a spring 49 wrapped around said inner tube 41.

A mouth piece 11 is sized to slidably fit inside a top end of said outer tube 21.

As depicted in FIG. 3B, the assembled view shows the spring 49 wrapping around the inner tube 41 and residing inside the outer tube 21.

Figure 1:
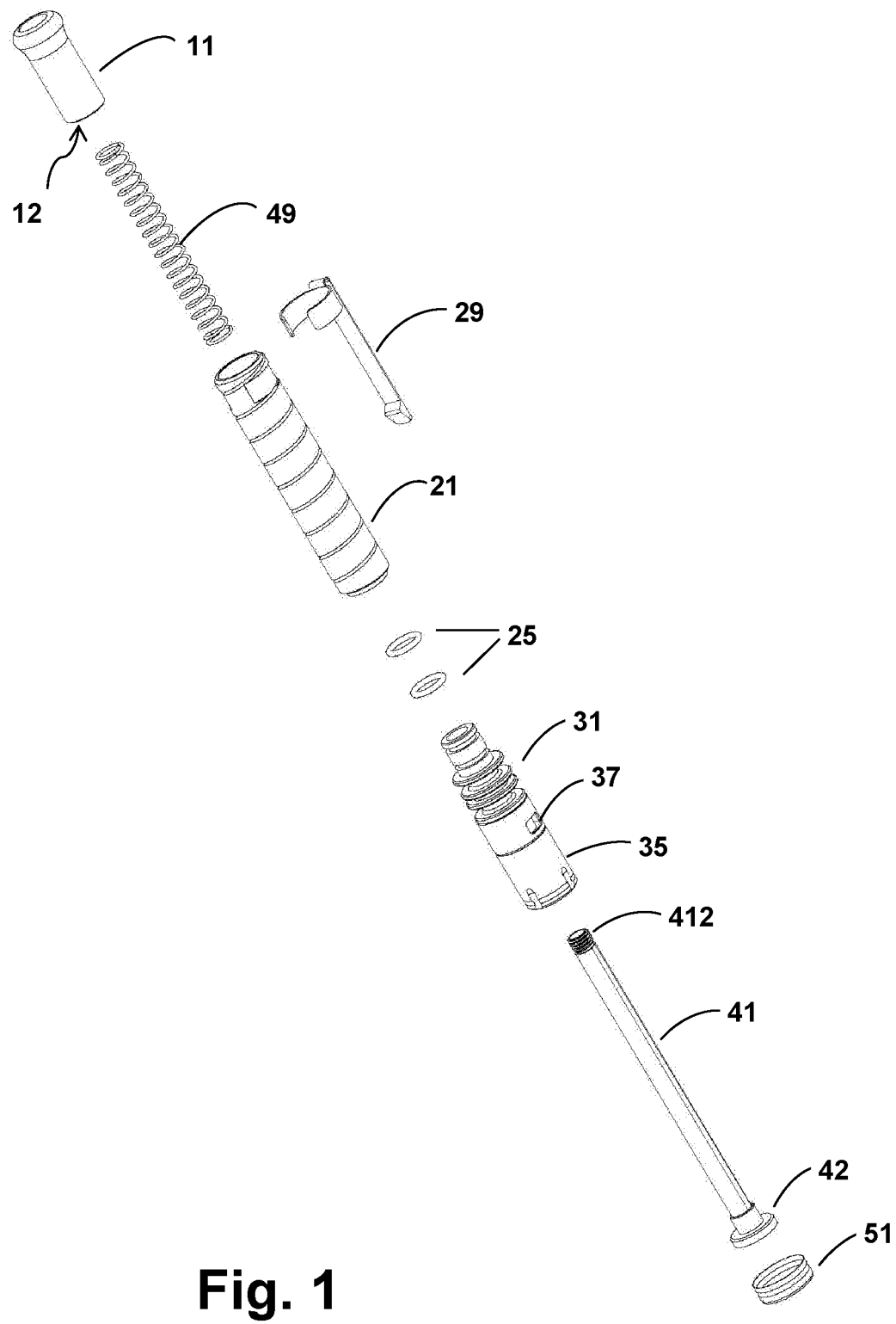
FIG. 1 shows an exploded view of the vaporizer of the present application.
Figure 2:
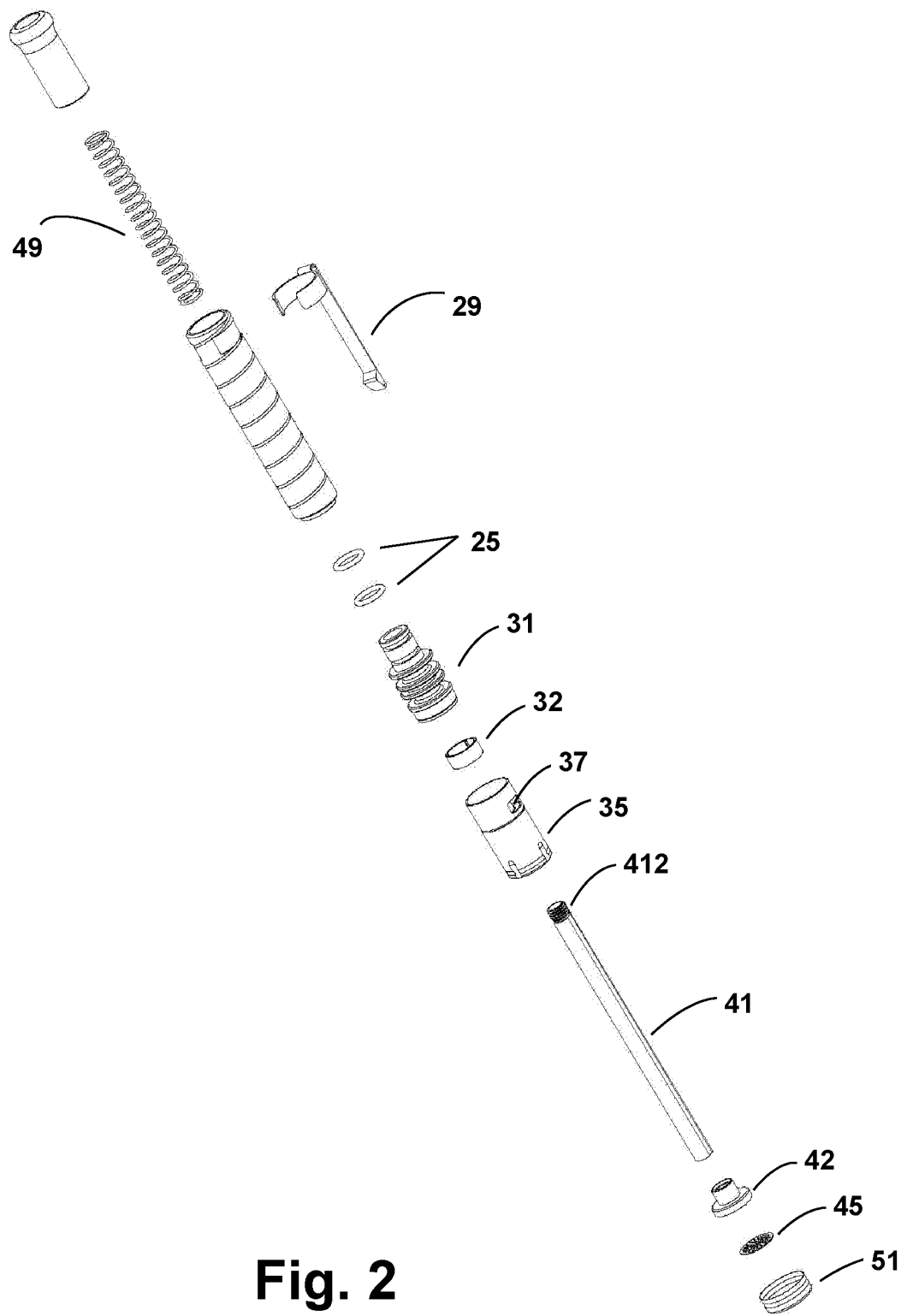
FIG. 2 is another exploded view of the vaporizer of the present application.

A heat sink 31 is connected to said outer tube 21. The heat sink 31, serving an insulation purpose, isolates the outer tube 21, which is the part held by human hands, from the high temperature generated by the heating chamber 35, which is connected to said heat sink 31, as shown in FIGS. 1 & 2.

The heating chamber 35 has a sensing coil 32 inside and is viewable through a side window 37. An end disc 42 is located at a distal end of said inside tube 41, said end disc 42 further has a filter piece 45.

FIG. 4A shows the cutout vertical (axial) view of the heating chamber 35 with the sensing coil 32 inside; FIG. 4B shows the sensing coil 32.

Figure 5A:
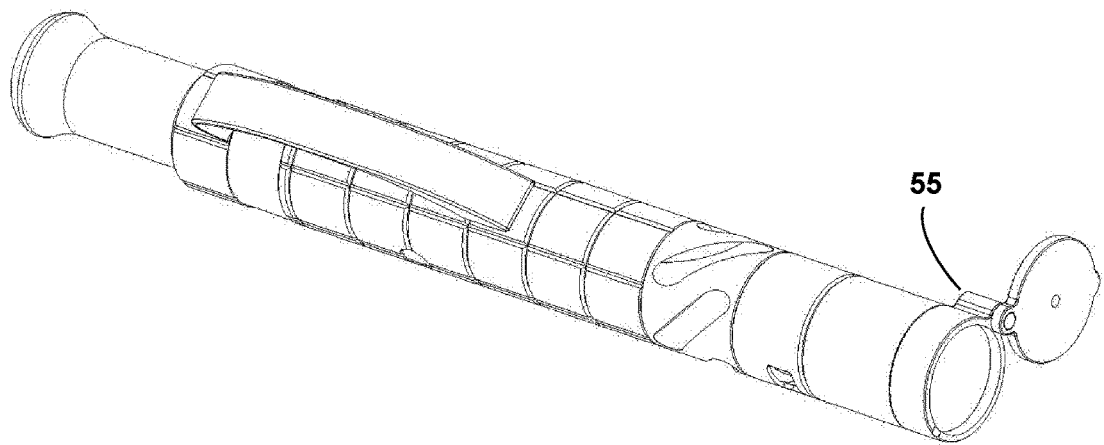
FIGS. 5A and 5B show the end cap with hinge connection.
Figure 5B:
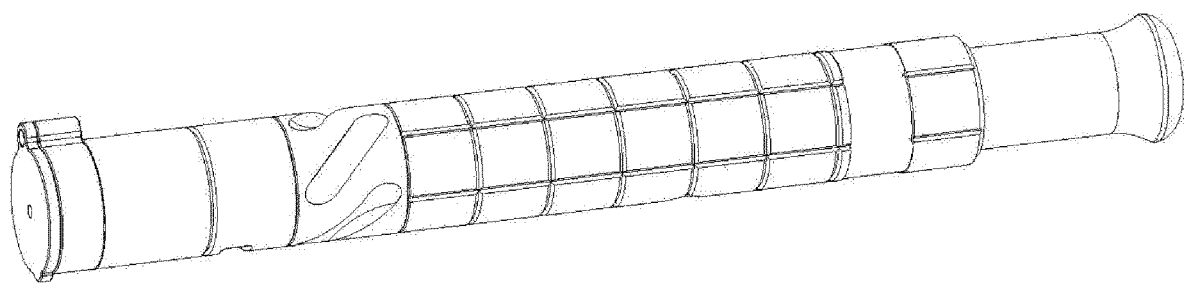

A detachable bottom cap 51 is connected to said heating chamber 35. The connection can be implemented by a hinge 55 as shown in FIGS. 5A and 5B, or simply a snug fit to place over the end disc 42 as shown in FIGS. 1 & 2.

In the snug-fit type implementation of detachable bottom cap 51, used vaping materials can be removed out from the heating chamber 35 by removing the cap 51. In the hinge-type implementation of detachable bottom cap 51, the cap 51 is swung, or twisted, around hinge 55, to open for removing the used vaping materials from the heating chamber 35. FIGS. 5A & 5B show such hinge-type implementation of the bottom cap 51.

The inner tube 41 has a threaded portion 412, as shown in FIG. 2, allowing the connection between the inner tube 41 and the mouth piece 11 containing an inner threaded portion 12 that is matching the thread pattern of the threaded portion 412.

The spring 49 has a top end connected to the mouth piece 11 and a bottom end touching the end disc 42, providing the resilient force when the mouth piece 11 is pressed inward.

The sensing coil 32 is anchored inside the heating chamber 35, as shown in FIG. 4A, and will extend its length when heated, causing said side window 37 to show different portions of the coil 32 at different temperatures. The sensing coil 32 can be painted with different colors at different sections, so that when it changes its length (due to heating up or cooling down), different colors are shown via the side window 37.

The heat sink 31 is further connected to the outer tube 21 via one or more O-rings 25, as shown in FIGS. 1 & 2, placed over a section of reduced diameter portion of the heat sink 31.

The outer tube 21 further has a clip 29, as shown in FIG. 3A, allowing easy carrying by users similar to people carrying a pen by clipping to a shirt pocket, pants pocket or coat pocket, etc.

As disclosed in the context of certain preferred or illustrated embodiments and examples, it will be understood by those skilled in the art that the inventive subject matter extends beyond the specifically disclosed embodiments to other alternative embodiments. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the similar features and aspects of the disclosed embodiments may be made and still fall within the scope of the invention stated herein. Accordingly, the scope of the inventive subject matter herein disclosed should not be limited by the particular disclosed embodiments described above, but should be determined only by the claims issued.

The invention claimed is:

1. Mechanical Vaporizer, comprising:
an outer tube;
a mouth piece sized to slidably fit inside a top end of said outer tube;
an inner tube inside said outer tube;
a spring wrapped around said inner tube;
a heat sink connected to said outer tube;
a heating chamber connected to said heat sink, said heating chamber has a sensing coil inside and is viewable through a side window; and
an end disc at a distal end of said inside tube, said end disc further has a filter piece; and
a detachable bottom cap connected to said heating chamber;
wherein said mouth piece has an inner thread portion for attaching to a threaded portion on said inner tube, and
wherein said spring has a top end connected to the mouth piece and a bottom end touching the end disc, providing the resilient force when the mouth piece is pressed inward; and
wherein said sensing coil is anchored inside the heating chamber and will extend its length when heated, causing said side window to show different portions of the coil at different temperatures.

2. The mechanical vaporizer of claim 1 wherein the heat sink connection to the outer tube is made via one or more O-rings placed over a section of reduced-diameter portion of the heat sink.

3. The mechanical vaporizer of claim 2 wherein the sensing coil is painted with different colors at different sections.

4. The mechanical vaporizer of claim 2 wherein the outer tube further having a clip.

5. The mechanical vaporizer of claim 2, wherein said detachable bottom cap can be pushed off the heating chamber when the mouth piece is pushed down all the way.

6. The mechanical vaporizer of claim 2, wherein a hinge connects said detachable bottom cap to the heating chamber, allowing said bottom cap to be swung open or close relative to the heating chamber.

* * * * *